United States Patent [19]

Fuderer

[11] Patent Number: 4,553,981
[45] Date of Patent: Nov. 19, 1985

[54] ENHANCED HYDROGEN RECOVERY FROM EFFLUENT GAS STREAMS

[75] Inventor: Andrija Fuderer, Antwerpen, Belgium

[73] Assignee: Union Carbide Corporation, Danbury, Conn.

[21] Appl. No.: 577,802

[22] Filed: Feb. 7, 1984

[51] Int. Cl.$^4$ .............................................. C01C 1/04
[52] U.S. Cl. .................................... 48/62 R; 48/77;
48/94; 48/95; 48/197 R; 48/210; 48/214 A;
48/215; 252/374; 252/375; 252/376; 422/234;
422/235; 423/359; 423/648 R; 423/650;
423/652; 423/655
[58] Field of Search ............................ 55/25, 26, 179;
422/234, 235; 48/197 R, 210, 214 A, 215, 62 R,
77, 94, 95; 423/648 R, 650, 652, 655, 359;
252/374, 375, 376

[56] References Cited

U.S. PATENT DOCUMENTS

| 3,430,418 | 3/1969 | Wagner .................................... 55/25 |
| 3,598,527 | 8/1971 | Quartulli et al. ..................... 423/361 |
| 3,986,849 | 10/1976 | Fuderer et al. ......................... 55/24 |
| 4,337,170 | 6/1982 | Fuderer .................................. 252/373 |

OTHER PUBLICATIONS

*Oil & Gas Journal*, vol. 79, No. 18, pp. 270, 275, 276, 278, 280, (May 4, 1981).

*Primary Examiner*—John Doll
*Assistant Examiner*—Wayne A. Langel
*Attorney, Agent, or Firm*—Alvin H. Fritschler

[57] ABSTRACT

Effluent gas streams for steam reforming, partial oxidation or coal gasification operations are advantageously treated in shift conversion, scrubbing and pressure swing adsorption units for recovery of a purified, hydrogen-containing product gas stream. By recycling a portion of the waste gas removed from the pressure swing adsorption system to the shift conversion unit and/or to the effluent gas generation operation, enhanced product recovery is achieved without the necessity for employing low temperature shift or for achieving essentially complete removal of the carbon dioxide content of the gas being treated prior to its passage to said pressure swing adsorption system.

42 Claims, 1 Drawing Figure

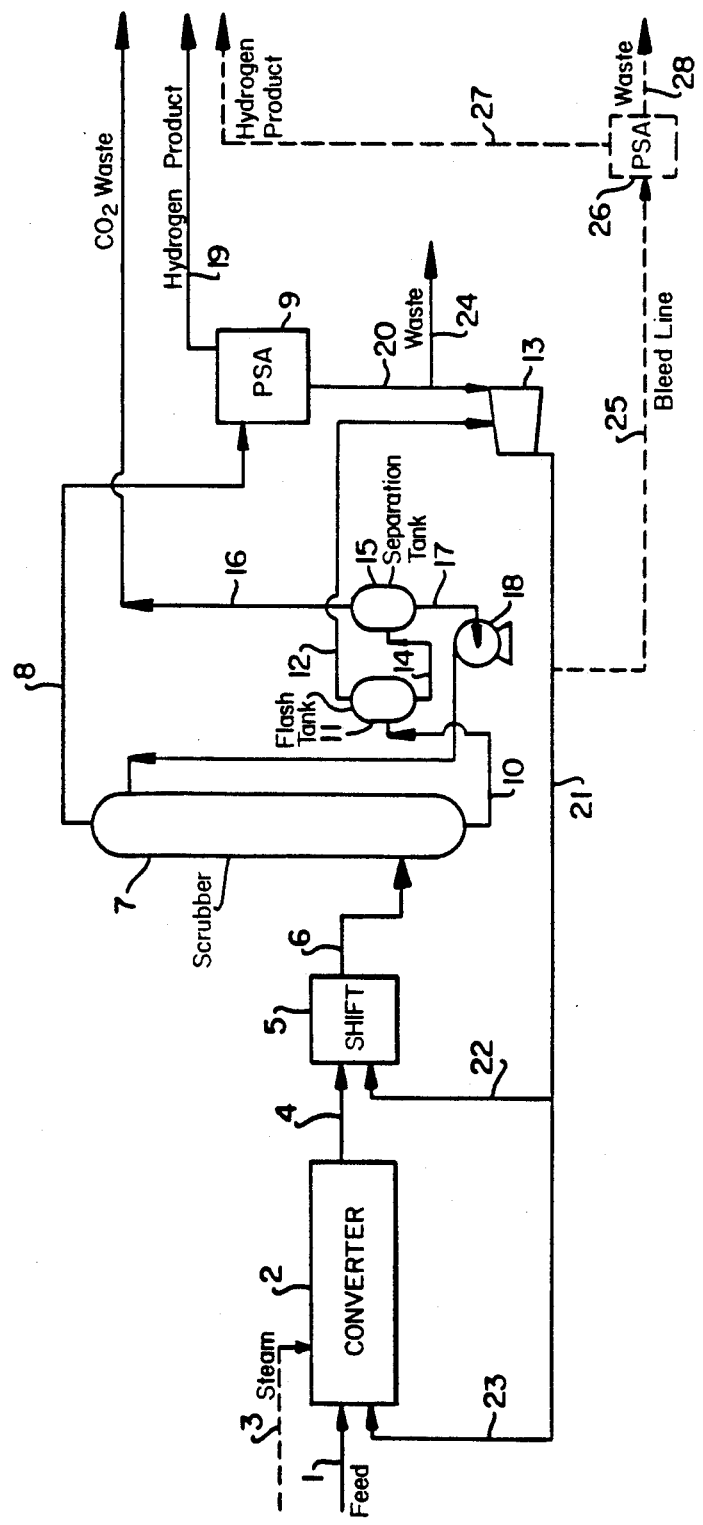

4,553,981

ENHANCED HYDROGEN RECOVERY FROM EFFLUENT GAS STREAMS

BACKGROUND OF THE INVENTION

1. Field of the Invention

The invention relates to the purification of a hydrogen-containing gas stream. More particularly, it relates to the use of a pressure swing adsorption system for the recovery of a purified hydrogen-containing product.

2. Description of the Prior Art

More than 90% of all the hydrogen presently used is produced either by steam reforming or by partial oxidation of various hydrocarbons. The effluent from such operations, or hydrogen-containing effluent gas streams from other operations such as coal gasification, are generally subject to the well-known water gas shift reaction to convert carbon monoxide therein to additional hydrogen and to carbon dioxide. After high temperature shift, the effluent gas streams typically have compositions, in mol % on a dry basis, on the order of the following:

|  | Hydrogen | $CO_2$ | CO, $CH_4$ and other |
|---|---|---|---|
| Steam Reforming Effluent | 68–75 | 17–25 | 2–15 |
| Partial Oxidation or Coal Gasification Effluent | 60–65 | 30–35 | 3–8 |

The thus-shifted gas stream is then further treated by alternative procedures to obtain the desired hydrogen product. Thus, the gas stream may be passed to a scrubbing unit for the removal of $CO_2$ down to about 0.1%. The effluent therefrom can be further treated to remove additional $CO_2$ so as to reduce the residual content thereof to about 1 ppm. Following such carbon dioxide removal, the effluent gas stream can be subjected to liquid nitrogen scrubbing or to cryogenic purification techniques to produce about a 97% hydrogen product stream, or a pure ammonia syngas stream, together with by-product fuel gas.

Alternatively, the effluent from high temperature shift conversion can be subjected to low temperature shift conversion for further CO conversion, and then passed to a scrubbing unit to achieve $CO_2$ removal down to about 0.1%. The effluent therefrom can then be subjected to methanation to produce said 97% hydrogen product stream. By either approach, essentially complete removal of carbon dioxide from the effluent stream is required, and in the case of the latter approach, both high temperature and the more costly, and more sensitive, low temperature shift conversion must be employed.

The desired hydrogen purification can also be accomplished by means of a process and system utilizing pressure swing adsorption (PSA) for final purification. Such a PSA approach has the advantages of simplification, ease of operation and of high hydrogen product purity, i.e. 99.99+%, than is achieved by the alternative approaches referred to above. There is a genuine desire in the art that improvements be developed to enhance the feasibility of employing the PSA approach in practical commercial operations. In particular, the obtaining of improvements in the recovery of purified hydrogen product is desired so that the size of the stream reformer, partial oxidation or other hydrogen-containing effluent gas stream generation unit can be optimized.

It is an object of the invention, therefore, to provide an improved process and system for the production of hydrogen-containing product gas.

It is another object of the invention to provide a process and system for the enhanced recovery of purified hydrogen product from effluent gas streams.

It is a further object of the invention to provide an improved overall process and system for the treatment of an effluent gas stream in which final purification of a hydrogen-containing product gas stream is achieved by pressure swing adsorption at high purity and recovery levels.

With these and other objects in mind, the invention is hereinafter described in detail, the novel features thereof being particularly pointed out in the appended claims.

SUMMARY OF THE INVENTION

A hydrogen-containing effluent gas stream is subjected to at least high temperature water gas shift conversion, scrubbed for removal of a major portion of its carbon dioxide content and introduced to a pressure swing adsorption system from which a purified hydrogen-containing product stream is recovered. The waste gas from the pressure swing adsorption system is recycled to the shift conversion operation or to the effluent gas stream generation operation. To avoid a build-up of nitrogen, argon, or methane in the system, a portion of the waste gas can be discharged or passed to a supplemental pressure swing adsorption system to recover additional hydrogen-containing product prior to discharge of said portion of the waste gas. Nitrogen and/or argon in the gas stream passed to the pressure swing adsorption system can be allowed to break through in o the purified gas product, if tolerable, to avoid build-up within the system. The countercurrent depressurization and/or purge steps of the pressure swing adsorption processing cycle can also be carried out with recycle of only that portion of the resulting effluent that is richest in hydrogen, with discharge of the portion thereof containing the principal amounts of said nitrogen and/or argon.

BRIEF DESCRIPTION OF THE DRAWING

The invention is hereinafter described in detail with particular reference to the accompanying single-figure drawing comprising a process flow diagram for a preferred embodiment of the invention in which a supplemental pressure swing adsorption system is employed.

DETAILED DESCRIPTION OF THE INVENTION

The practice of the invention enables the objectives set forth above to be achieved, with high purity hydrogen-containing product being obtained at advantageously high recovery levels. Simplified processing procedures and apparatus features can be employed, with desirable conditions for water gas shift conversion and for carbon dioxide scrubbing contributing to the favorable overall technical-economic aspects of the invention. By using particular processing conditions, undesired build-up of methane, nitrogen and/or argon in the system can be avoided, while the recovery of product gas is nevertheless enhanced.

As indicated above, primary and secondary reforming, partial oxidation and coal gasification are examples of well-known processing operations that generate effluent gas streams useful in the practice of the invention.

Such streams contain hydrogen desired as a product gas, together with carbon dioxide, carbon monoxide and other constituents such as methane, nitrogen, argon, water vapor and the like. In accordance with the invention, the effluent gas stream is subjected to high temperature water gas shift conversion to convert carbon monoxide therein to additional hydrogen and carbon dioxide. Following such shift conversion, a major portion of the carbon dioxide content of the effluent gas stream is removed therefrom. The carbon dioxide-depleted effluent gas stream is then passed to a PSA system capable of discharging a purified, hydrogen-containing product gas therefrom as a less readily adsorbable component of said effluent stream. The more readily adsorbable component thereof comprises carbon dioxide and other impurities present in the effluent stream being treated. The more readily adsorbable component is removed from the PSA system as waste gas during the desorption steps carried out in each adsorbent bed of the system. Such waste gas is compressed and at least about 40% thereof is recycled to the shift conversion step and/or to the effluent gas generation step, as is further described below.

The effluent gas stream obtained from a gas generation system will typically be available at a temperature of about 800° C. or higher. This gas stream is cooled to on the order of about 350° C.–400° C. prior to being subjected to catalytic water gas shift conversion. Those skilled in the art will readily appreciate that conversion at this temperature level constitutes high temperature shift that is carried out in the presence of known, commercially available chromium-based water gas shift catalysts. Water gas shift conversion at lower temperature levels, e.g., about 250° C., are also known in the art and are generally carried out in the presence of a known, commercially available copper-based catalyst. While the carrying out of low temperature shift upon completion of high temperature shift to achieve a more complete shift conversion, as in one of the conventional approaches referred to above, is within the scope of the invention, it should be noted that in general only the one high temperature shift reaction is needed for purposes of the invention. This is of practical operating significance as the copper-based shift conversion catalyst employed at said lower temperature levels is more expensive and more delicate or sensitive during use than the chromium-based catalyst employed for high temperature shift conversion.

It is, in any event, within the scope of the invention to carry out the shift conversion step so as to convert most of the carbon monoxide in the effluent stream to additional hydrogen and carbon dioxide by subjecting said stream to at least a high temperature catalytic water gas shift conversion. For this purpose, more than about 80%, typically from about 85% to 98%, of the CO content of the effluent stream will generally be converted in the practice of the invention.

Following such shift conversion, the thus-treated effluent stream is passed to a carbon dioxide scrubbing zone where again the requirements are less stringent than pertain to the conventional approaches referred to above. Thus, at least a major portion of the carbon dioxide content of the effluent stream is removed therefrom in said scrubbing zone, but the residual $CO_2$ level need not be reduced to 0.1%, or to about 1 ppm, as is required in the practice of said conventional approaches. It is generally sufficient if more than about 70%, preferably between from about 85 to about 99.9%, by volume of the carbon dioxide content of the effluent stream, which is commonly on the order of 25%, is removed in the scrubbing step. The residual carbon dioxide content of the thus carbon dioxide-depleted effluent stream is thereby typically reduced to from about 2% to about 7% of the effluent stream, conveniently to from about 3% to about 5%. Those skilled in the art will appreciate that not being required to assure essentially complete removal of carbon dioxide from the effluent stream prior to its passage to the pressure swing adsorption system represents a highly advantageous feature of the invention vis-a-vis the conventional approaches referred to above for producing hydrogen from effluent gas streams.

The thus carbon dioxide-depleted effluent stream is passed, in the practice of the invention, to a pressure swing adsorption system capable of discharging a purified, hydrogen-containing product gas therefrom as a less readily adsorbable component of said effluent stream. The more readily adsorbable component thereof comprises residual carbon dioxide and other impurities present in the effluent stream. It will be appreciated that said more readily adsorbable component is removed from the pressure swing adsorption system during the countercurrent depressurization and/or purge steps of the processing cycle in each bed of the adsorption system. The PSA cycle, carried out in sequence in each adsorbent bed, comprises higher pressure adsorption with discharge of less readily adsorbable component from the product end of the bed, cocurrent depressurization with release of void space gas from the product end of the bed, countercurrent depressurization to lower desorption presence and/or purge with release of impurities-containing waste gas from the feed end of the bed, and repressurization to higher adsorption pressure. Those skilled in the art will appreciate that various processing and appropriate modifications can be made in the PSA process and system, within the known state-of-the-art with respect to PSA technology, without defecting from the scope of the invention. For example, the PSA process is commonly carried out in systems having four or more adsorbent beds therein, and the invention can readily be carried out in such multi-bed systems. Those skilled in the art will appreciate that, in such multi-bed systems, the void space gas released from the product end of one bed during cocurrent depressurization therein is conveniently passed to another bed in the system for pressure equalization and/or provide purge purposes.

The waste gas removed from the pressure swing adsorption system during said countercurrent depressurization and/or purge steps is compressed, and at least about 40% of the compressed waste gas is recycled to the shift conversion and/or effluent gas generation steps in the practice of the invention. Referring to the drawing with respect to the overall processing flow diagram and elements of apparatus employed in carrying out the invention, the numeral 1 represents conduit means or a processing line for passing a hydrocarbon feed stream to a steam reformer, partial oxidation unit, coal gasification unit or other such hydrocarbon conversion means 2 for generating a hydrogen-containing effluent gas stream. For catalytic steam reforming operations, steam is also added to said conversion means 2 by means of conduit 3. The effluent gas stream is passed from said reformer or other conversion means 2 through conduit means 4 to cooling and catalytic water gas shift conversion means 5 for converting carbon monoxide in said effluent gas stream to hydrogen and carbon dioxide. This thus-treated effluent stream leaving conversion means 5 at a temperature on the order of about 430° C. is passed through conduit means 6, with appropriate cooling, and is introduced into liquid scrubbing means 7 capable of removing at least a major portion of the carbon dioxide from said effluent stream. The thus carbon dioxide-depleted effluent stream is passed from said scrubbing means 7 through conduit 8 for passage to PSA system 9, while the carbon dioxide-containing adsorber liquid or solvent is passed from said scrubbing means 7 through conduit 10 to flash tank 11, from which flash gas in line 12 is conveniently passed to recycle compressor 13 for return to shift conversion means 5 and/or hydrocarbon conversion means 2, if desired. In the illustrated embodiment, adsorber liquid is passed from flash tank 11 through conduit 14 to separation tank 15 from which carbon dioxide waste gas can be removed from the system through conduit 16. In place of a simple flash tank 15, a multistage flash system or a stripping column can also be applied using steam, nitrogen or an other suitable stripping gas. Regenerated adsorber liquid is passed from said tank 15 through conduit 17 containing solvent pump 18 for return to said scrubbing means 7. A purified hydrogen-containing product gas is discharged from PSA system 9 through conduit as the less readily adsorbable component of the effluent stream being treated in said PSA system. As indicated above, said product gas can readily have a high hydrogen product purity of 99.99% or more in accordance with the capability of established PSA technology. During the countercurrent depressurization and/or purge steps in each adsorbent bed of said PSA system 9, an impurities-containing waste gas is released from the feed end of the bed, said waste gas passing from said PSA system 9 through conduit 20 for repressurization in said recycle compressor 13. At least about 40% of said compressed waste gas is passed through recycle conduit 21 for passage to conduit 22 for recycle to shift conversion means 5 and/or for passage to conduit 23 for recycle to hydrocarbon conversion means 2 in the practice of the invention.

It is within the scope of the invention, as when said waste gas being treated contains methane, to divert a portion of said waste gas from the system. For this purpose, conduit 24 is provided, it being understood that the methane-containing waste gas is suitable for use as a fuel gas. When the effluent gas stream contains nitrogen and/or argon, it is likewise convenient to divert at least a portion of the nitrogen and/or argon containing waste gas from the pressure swing adsorption system as by said conduit 24. Such diversion of methane, nitrogen and/or argon serves to prevent too high accumulation of such components in the recycle loop of the process and apparatus of the invention.

It is within the scope of the invention to provide other, advantageous means for avoiding undue accumulation of methane in said recycle loop. Thus, at least a portion of methane-containing waste gas from the pressure swing adsorption system can be recycled at elevated pressure to said effluent gas generation step, ie., by passage through conduit 23 to conversion means 2. When said means 2 comprises a steam reformer or partial oxidation unit, the methane is converted to additional quantities of desired hydrogen. Similarly, when conversion means 2 is a coal gasification unit, said portion of the recycled waste gas can be recycled to the gasification unit.

It will be appreciated that the portion of the recycle waste stream passed to conversion means 2 instead of to shift conversion means 5 will vary depending upon the circumstances applicable to any given hydrogen production operation. For example, when an effluent gas stream is generated by primary steam reforming of hydrocarbons without the secondary reforming thereof, and the reformer effluent gas stream contains at least about 3 vol percent methane, at least about 20% of the recycled waste gas from the pressure swing adsorption system is recycled to the reformer in desirable embodiments of the invention. In particular embodiments, from about 20% to 60% of said recycled waste gas, preferably from about 30% to about 40%, is thus recycled to the reformer. If, on the other hand, the effluent gas stream from conversion means 2 contains very little methane, then most of the waste gas from the pressure swing adsorption system is desirably recycled directly to shift conversion means 5, as through conduit 22. For example, in applications in which a primary reforming effluent stream is subject to secondary reforming, whereby the secondary reformer effluent gas contains less than about 1 vol percent methane, at least about 20% and generally the greater portion of the waste gas recycled from the pressure swing adsorption system, up to about 90% thereof, is advantageously recycled to shift conversion means 5. In other applications wherein other amounts of methane are present in said recycled waste gas, the portion of the recycled waste gas recycled to said conversion means 2 and to said shift conversion means 5 can be determined for optimum hydrogen recovery and overall process performance in accordance with the particular operating circumstances applicable to such applications. In each instance, however, the effluent gas stream is generally cooled to on the order of about 350° C. prior to use in the conversion step.

In another desirable embodiment of the invention, a portion of a methane-containing waste gas from the pressure swing adsorption system is directed at an elevated adsorption pressure to a supplemental pressure swing adsorption system. In the drawing, this embodiment is provided for by the inclusion of optional bleed line 25 by means of which a portion of methane-containing waste gas can be directed to supplemental PSA system 26. The less readily adsorbable product gas discharged therefrom comprises additional purified, hydrogen-containing product that may be withdrawn through conduit 27. The more readily adsorbable waste gas separated from said product gas in PSA system 26 is removed therefrom through conduit 28. This methane-containing gas stream is suitable for use, if desired, as a fuel gas. It will be appreciated that a combination of such means described above for avoiding methane build-up can be employed in the practice of the invention. Thus, a portion of the methane-containing compressed recycle gas can be passed to conversion means 2, wherein the methane can be converted to form additional hydrogen, while a portion of the PSA waste gas may not be compressed, but sent to fuel by discharge through conduit 24. In another embodiment, a portion of the compressed PSA waste gas in conduit 21 may be diverted through conduit 25 to supplemental PSA system 26 while a portion of the waste gas from said PSA system 9 is not compressed but is diverted from the system through conduit 24 for use as fuel or for other purposes.

As indicated above, the diversion of a portion of the PSA waste gas in conduit 20 from the process and system through said conduit 24 can be employed to avoid undue build-up of nitrogen and/or argon in the recycle loop of the invention. In addition, the higher pressure adsorption step in PSA system 9 can be carried out so as to allow a breakthrough of nitrogen and/or argon into the purified, hydrogen-containing product gas discharged from the product end of each adsorbent bed of the system. The use of this option is, of course, dependent upon the applicable product specifications pertaining to any given application. This option may also be used in combination with other processing variations for optimal performance in particular applications.

In a highly advantageous and unique embodiment of the invention, the undesired build-up of nitrogen and/or argon in the recycle loop of the invention can be avoided by recycling, as in recycle conduit 21 of the drawing, only the portion of the waste gas from PSA system 9 that is richest in the hydrogen gas desired to be recovered. Such gas richest in hydrogen is released during the initial, higher pressure portion of the countercurrent depressurization step carried out in said PSA system 9. The gas released during further countercurrent depressurization to lower desorption presence, together with additional gas released upon purge, if employed, at said lower desorption pressure, is diverted from the process, as through conduit 24, in this embodiment of the invention. It has been found that, in many applications, the gas richest in hydrogen, and relatively free of nitrogen and argon, is released during the initial, higher pressure portion of the countercurrent depressurization step up to, typically, 40% of the overall gas released during said countercurrent depressurization step. Utilization of from the first 20% of said gas released upon countercurrent depressurization, up to about 40% thereof, for recycle to the shift conversion and/or effluent gas generation steps (apart from other processing variations related to methane utilization) is particularly desirable as a means for avoiding undue nitrogen and/or argon build-up in the recycle loop of the invention. In a further, highly desirable embodiment of the invention wherein a purge step is employed following countercurrent depressurization of the adsorbent beds in said PSA system 9, additional gas released from each bed during the last portion of the purge step is recycled together with said gas released during the initial, higher pressure portion of the countercurrent depressurization step in each bed. It has been found that said gas released during the last portion of the purge step, as during the last 50% or less thereof, is relatively free of nitrogen and/or argon. It will be appreciated that such hydrogen-containing gas relatively free of nitrogen and/or argon, obtained particularly during purge under gradually increasing pressure conditions, is desirably recycled for purposes of the invention, while the gas released during the remaining portion of the countercurrent depressurization step and during the initial portion of the purge step is conveniently diverted from the process and system of the invention. It will readily be appreciated that such unique processing refinements enable the recovery of product hydrogen to be enhanced in accordance with the simplified and highly desirable processing features of the overall invention.

Those skilled in the art will appreciate that various changes and modifications can be made in the details of the process and system hereinabove described without departing from the scope of the invention as set forth in the appended claims. Thus, it will be understood that the PSA process and systems employed can incorporate any desired number of adsorbent beds and any convenient, known processing cycles for recovering product hydrogen in the main PSA system and, when employed, in the supplemental PSA system 26. Any suitable adsorbent material having a desirable selectivity for purposes of the invention can be used in the practice of the invention. Suitable adsorbents include zeolitic molecular sieves, activated carbon, silica gel, activated alumina and the like. Zeolite molecular sieve adsorbents are generally desirable in the subject separation and purification of hydrogen from effluent gas streams. Information containing such zeolitic molecular sieves is contained in the Kiyonaga patent, U.S. Pat. No. 3,176,444 and various other patents relating to the PSA process and system as employed in its various embodiments. Likewise, the carbon dioxide scrubbing step can be carried out using any known, commercially available scrubbing techniques and liquid scrubbing materials. The Benfield aqueous alkaline scrubbing process, the Shell Sulfinol and the Allied Chemical Selexol solvent extraction processes are examples of commercial techniques for removing carbon dioxide from gas streams that are useful in the practice of the invention. With respect to various embodiments falling within the scope of the invention, it should also be noted that the process of the invention can be employed for the separation and purification of a mixture of hydrogen and nitrogen, useful as an ammonia synthesis gas mixture. In such an application, wherein external source nitrogen can be used for purge and/or repressurization as is known in the art, the purified product gas stream will generally contain more than 99 mol percent hydrogen and nitrogen, with less than 1 mol percent of argon, methane or other gases.

In an illustrative example of the practice of the invention employing the apparatus shown in the drawing, the effluent from a partial oxidation unit containing 0.5% methane is passed to high temperature shift conversion and $CO_2$ removal by scrubbing prior to being passed to a PSA system for hydrogen separation and purification. 80% of the PSA waste gas is recycled to the shift converter. 15% is recycled to the partial oxidation unit, and 5% is discharged from the process for use as fuel gas. The feed gas to said PSA system contains 2.5 mol percent methane, almost all of the carbon monoxide present in the effluent gas stream from the partial oxidation unit is converted to product hydrogen and by-product carbon dioxide, and 99% of all of the hydrogen present in said effluent gas stream is recovered. Such advantageous results are achieved without the necessity of employing low temperature shift or for assuring essentially complete removal of carbon dioxide from the effluent stream prior to its passage to the PSA system.

In a similar illustrative example, the effluent gas stream obtained upon the steam reforming of natural gas is found to contain 2.5 mol percent methane on a dry basis. Upon treatment in said shift converter and in the scrubbing zone operated under conditions as described above, the feed gas to the PSA system is found to contain 6.7% methane. Two-thirds of the PSA waste gas is recycled to the shift converter, and one-third is recycled to the steam reformer. By carrying out the hydrogen production process in this manner in accordance with the practice of the invention, essentially all of the CO present is converted in the process, and essentially all of the hydrogen is recovered.

In a further illustration of the overall advantages of the invention, the effluent gas stream discharged upon the steam reforming of naphtha is found to contain 5 mol percent methane on a dry basis. After cooling and shift conversion, the effluent gas stream being treated is passed to an absorption scrubbing column wherein its carbon dioxide concentration is reduced to 3.5 mol percent. Subsequently, the gas is further purified in a PSA system to produce a 99.99% pure hydrogen stream, and a PSA waste gas stream containing 51.4 mol percent hydrogen, 13.1 mol percent $CO_2$, 12.1 mol percent CO and 23.4 mol percent methane. About 20% of the PSA waste gas is discharged to a fuel gas system, and 50% of said waste stream is recompressed and recycled to the steam reformer unit, and 30% thereof is so recycled to the shift converter. Essentially all of the carbon monoxide in the effluent gas stream treated in accordance with the invention is converted to product hydrogen and by-product carbon dioxide that are reserved in the process. Essentially complete recovery of hydrogen is obtained thereby.

It should be noted that, when coal or heavy oils are gasified by partial oxidation or other conversion processes, the effluent gas stream generally contains hydrogen sulfide in addition to carbon dioxide. At least a major portion of such components can be removed in the scrubbing zone, in accordance with the invention, preferably using selective solvents so that carbon dioxide essentially free of $H_2S$ and a $H_2S$-rich gas stream are separately obtained. It is not necessary, in such embodiments of the invention, to achieve essentially complete removal of $H_2S$ in the scrubbing zone as final purification can be accomplished in the pressure swing adsorption system.

In conventional processing without resort to cryogenic purification, the severity of the reforming operation, or of partial oxidation, must be maintained at a high level in order to desirably reduce the methane content of the product gas obtained. Conversion in the steam reformer is generally between 85% and 93%. Since 2-3% of the feed is converted back to methane in the methanation step employed in the absence of cryogenic purification, it will be appreciated that only between about 83% and about 90% of the feed is ultimately converted to product hydrogen and by-product carbon dioxide. In the practice of the invention, on the other hand, the steam reformer can be operated at lower severity, i.e., at a lower outlet temperature level, and/or at a lower steam-to-carbon ratio, if desired, so that lower investment costs and/or lower steam requirements can be realized. In addition, the hydrocarbon feed to the reformer can be reduced by between 8% and 17% in the practice of the invention. This is especially important when naphtha feedstock is employed. The advantageous conditions pertaining to the invention also make it possible to reduce the steam added to the feed by between about 10% and about 30%, thereby reducing the fuel requirements of the process or permitting the export of steam from the process and system.

As described above, the invention can be practiced without a requirement for employing a low temperature shift conversion step. In addition, the ability to employ a low cost carbon dioxide absorption process for the removal of at least a major portion of the carbon dioxide from the effluent stream being treated results in a permissibly low utilities requirement in the carbon dioxide removal step. As previously indicated, the practice of the invention requires no methanation or cryogenic purification operations as in the conventional processes.

The use of pressure swing absorption for final hydrogen purification enables a higher purity hydrogen product to be produced than is obtained by conventional approaches. It will be appreciated that this substantially reduces the hydrogen requirements of downstream hydrogenation processing operations, further contributing to the overall advantages of the invention. From an overall viewpoint, the process and system of the invention will be seen to provide unequalled efficiency. All of the feedstock employed in the steam reformer, partial oxidation unit or other hydrogen-containing effluent gas stream generating means is converted essentially into two products, namely carbon dioxide and product hydrogen that can be recovered at very high purity by means of the PSA system and with exceptionally high recovery by the use of the PSA system in accordance with the invention. Because of such advantages, the investment cost of hydrogen production by the practice of the invention is estimated to be between 2% and 12% lower than the investment costs for a comparable conventional plant. Even more significantly, however, are the significant savings on fuel and feedstock costs made possible by the invention, such savings far outweighing the power cost for the recycle compressor used in the practice of the invention. As a result of all such significant advantages and benefits flowing from the process and apparatus as herein described and claimed, it is estimated that operating savings in excess of one million dollars a year can be realized for a plant producing six tons per hour of product hydrogen. For partial oxidation or coal gasification operations, the PSA approach of the invention requires less feed materials as well as less oxygen than in conventional approaches. For all of these reasons, it will be appreciated that the process and approaches as described and claimed herein represents a highly significant and beneficial advance in the art of producing hydrogen from effluent streams produced by steam reforming, partial oxidation, coal gasification and like processes for generating hydrogen-containing effluent streams.

I claim:

1. An improved process for the production of a hydrogen-containing product gas consisting essentially of:
   (a) generating an effluent gas stream comprising hydrogen, carbon dioxide, carbon monoxide and water vapor;
   (b) upon cooling said effluent stream to about 350° C. –400° C., subjecting said effluent stream to at least a high temperature catalytic water gas shift conversion, thereby converting most of the carbon monoxide in said effluent stream to additional hydrogen and carbon dioxide;
   (c) scrubbing at least a major portion of the carbon dioxide from said thus-treated effluent stream to produce a carbon dioxide-depleted effluent stream but without essentially complete removal of carbon dioxide therefrom;
   (d) passing the thus carbon dioxide-depleted effluent stream to a pressure swing adsorption system capable of discharging a purified, hydrogen-containing product gas therefrom as a less readily adsorbable component of said effluent stream, the more readily adsorbable component thereof comprising residual carbon dioxide and other impurities present in said effluent stream, said more readily adsorbable component being removed from the pressure swing adsorption system during the countercurrent depressurization and/or purge steps of the processing cycle in each adsorbent bed of said system, said cycle comprising higher pressure adsorption with discharge of said less readily adsorbable component from the product end of the bed, cocurrent depressurization with release of void space gas from the product end of the bed, countercurrent depressurization of the bed to lower desorption pressure and/or purge with release of impurities-containing waste gas from the feed end of the bed, and repressurization to higher adsorption pressure;

(e) compressing said waste gas removed from the pressure swing adsorption system during said countercurrent depressurization and/or purge steps;

(f) recycling at least about 40% of said compressed waste gas to said shift conversion and/or effluent gas generation steps for additional hydrogen production, whereby said effluent gas stream is advantageously converted to the desired hydrogen-containing product stream and carbon dioxide waste gas at high hydrogen product recovery levels.

2. The process of claim 1 in which said effluent gas stream is generated by the primary steam reforming of hydrocarbons without the secondary reforming thereof.

3. The process of claim 2 and including subjecting said primary reforming effluent to secondary reforming.

4. The process of claim 1 in which said effluent gas stream is generated by the partial oxidation of hydrocarbons.

5. The process of claim 1 in which said effluent gas stream is generated by coal gasification.

6. The process of claim 2 in which the reformer effluent gas stream contains at least about 3 vol. % methane, at least about 20% of the recycled waste gas from the pressure swing adsorption system being recycled to said reformer employed for said primary steam reforming.

7. The process of claim 3 in which the secondary reformer effluent gas contains less than about 1 vol. % methane, at least about 20% of the waste gas recycled from the pressure swing adsorption system being recycled to the shift conversion step.

8. The process of claim 1 and including cooling said effluent gas stream to on the order of about 350° C. prior to said conversion step.

9. The process of claim 1 in which said effluent gas stream also contains methane.

10. The process of claim 9 in which at least a portion of the methane-containing waste gas from the pressure swing adsorption system is recycled at an elevated pressure to said effluent gas stream generation step.

11. The process of claim 9 in which a portion of the methane-containing waste gas from the pressure swing adsorption system is diverted at an elevated adsorption pressure to a supplemental pressure swing adsorption system, the less readily adsorbable product gas discharged therefrom comprising additional purified, hydrogen-containing product, and the more readily adsorbable waste gas removed therefrom comprising a methane-containing gas stream suitable for use as a fuel gas.

12. The process of claim 9 in which a portion of the methane-containing waste gas from the pressure swing adsorption system is diverted from the process, said diverted waste gas being suitable for use as a fuel gas.

13. The process of claim 10 in which a portion of said waste gas from the pressure swing adsorption process is recycled to said effluent gas generation step and a portion of said waste gas is diverted from the process.

14. The process of claim 11 in which a portion of said waste gas from the pressure swing adsorption process is diverted to said supplemental pressure swing adsorption system and a portion of said waste gas is diverted from the overall process.

15. The process of claim 1 in which said effluent gas stream also contains nitrogen and/or argon.

16. The process of claim 15 in which the higher pressure adsorption step in said pressure swing adsorption system is carried out so as to allow a breakthrough of said nitrogen and/or argon into the purified, hydrogen-containing product gas discharged from the product end of the adsorbent bed.

17. The process of claim 15 in which at least a portion of the nitrogen and/or argon containing waste gas from the pressure swing adsorption system is diverted from the process.

18. The process of claim 15 in which the recycled waste gas from the pressure swing adsorption system comprises only the gas richest in hydrogen released during the initial, higher pressure portion of the countercurrent depressurization step, the gas released during further countercurrent depressurization to lower desorption pressure, together with any additional gas released at said lower desorption pressure, being diverted from the overall process.

19. The process of claim 15 in which the recycled waste gas from the pressure swing adsorption system comprises the gas richest in hydrogen released during the initial, higher pressure portion of the countercurrent depressurization step, together with gas released during the last part of the purge step, said nitrogen and/or argon being removed from the bed principally during the last portion of said countercurrent depressurization step and during the initial portion of said increasing pressure purge step.

20. The process of claim 13 in which said effluent gas stream is generated by the primary steam reforming of hydrocarbons without the secondary reforming thereof, the reformer effluent gas stream containing at least about 3 vol. % methane, at least about 20% of the waste gas from the pressure swing adsorption system being recycled to the primary reformer.

21. The process of claim 20 in which said effluent gas stream also contains nitrogen and/or argon and in which the higher pressure adsorption step in said pressure swing adsorption system is carried out so as to allow a breakthrough of said nitrogen and/or argon into the purified, hydrogen-containing product gas discharged from the product end of the adsorbent bed.

22. The process of claim 20 in which said effluent gas also contains nitrogen and/or argon and in which the recycled waste gas from the pressure swing adsorption system comprises only the gas richest in hydrogen and relatively free of nitrogen and argon released during the initial, higher pressure portion of the countercurrent depressurization step.

23. The process of claim 20 in which said effluent gas system also contains nitrogen and/or argon and in which the recycled waste gas from the pressure swing adsorption system comprises the gas richest in hydrogen released during the initial, higher pressure portion of the countercurrent depressurization step, together with gas released during the last portion of the purge step, such recycled waste gas being relatively free of nitrogen and/or argon.

24. The process of claim 13 in which said effluent gas stream is generated by the secondary reforming of a primary reformer effluent or by partial oxidation of hydrocarbons, said effluent gas stream containing less than about 1 vol. % methane, at least about 20% of the waste gas from the pressure swing adsorption system being recycled to the shift conversion step.

25. The process of claim 24 in which said effluent gas stream also contains nitrogen and/or argon and in which the higher pressure adsorption step in said pressure swing adsorption system is carried out so as to allow a breakthrough of said nitrogen and/or argon into the purified, hydrogen-containing product gas discharged from the product end of the adsorbent bed.

26. The process of claim 24 in which said effluent gas stream also contains nitrogen and/or argon and in which the recycled waste gas from the pressure swing adsorption system comprises only the gas richest in hydrogen and relatively free of nitrogen and argon released during the initial, higher pressure portion of the countercurrent depressurization step.

27. The process of claim 24 in which said effluent gas stream also contains nitrogen and/or argon and in which the recycled waste gas from the pressure swing adsorption system comprises the gas richest in hydrogen released during the initial, higher pressure portion of the countercurrent depressurization step, together with gas released during the last portion of the purge step, such recycled gas being relatively free of nitrogen and/or argon.

28. The process of claim 20 in which said effluent gas stream also contains nitrogen and/or argon and in which at least a portion of the waste gas from the pressure swing adsorption process is diverted from the process.

29. The process of claim 24 in which said effluent gas stream also contains nitrogen and/or argon and in which at least a portion of the waste gas from the pressure swing adsorption process is diverted from the process.

30. The process of claim 1 in which said hydrogen-containing product gas comprises an ammonia synthesis gas mixture of hydrogen and nitrogen.

31. An improved apparatus for the production of a hydrogen-containing product gas consisting essentially of:
(a) means for generating an effluent gas stream comprising hydrogen, carbon monoxide and carbon dioxide;
(b) cooling and high temperature catalytic water gas shift conversion means for converting carbon monoxide in said effluent gas stream to hydrogen and carbon dioxide;
(c) scrubbing means capable of removing at least a major portion of the carbon dioxide from the thus-water gas shifted effluent gas stream, but without essentially complete removal of carbon dioxide therefrom;
(d) a pressure swing adsorption system capable of discharging a purified, hydrogen-containing gas stream and waste gas comprising residual carbon dioxide and other impurities present in said effluent gas stream;
(e) compression means for compressing said waste gas; and
(f) conduit means for recycling at least about 40% of said compressed waste gas to said shift conversion means and/or to said means for generating an effluent gas stream, whereby said effluent gas stream may advantageously be converted to the desired hydrogen-containing product stream and a carbon dioxide waste gas at high hydrogen product recovery levels.

32. The apparatus of claim 31 and which said means for generating an effluent gas stream comprises a primary steam reformer.

33. The apparatus of claim 32 and including a secondary reformer.

34. The apparatus of claim 31 in which said means for generating an effluent gas stream comprises a partial oxidation unit.

35. The apparatus of claim 31 in which said means for generating an effluent gas stream comprises a coal gasification unit.

36. The apparatus of claim 31 and including a supplemental pressure swing adsorption system and conduit means for diverting at least a portion of the waste gas from said pressure swing adsorption system to said supplemental pressure swing adsorption system.

37. The apparatus of claim 31 and including conduit means for discharging a portion of the waste gas from the pressure swing adsorption system.

38. The apparatus of claim 36 and including recovering the less readily adsorbed product gas as additional purified, hydrogen-containing product.

39. The apparatus of claim 31 in which said conduit means is adapted to recycle compressed waste gas to said shift conversion means.

40. The apparatus of claim 31 in which said conduit means is adapted to recycle compressed waste gas to said means for generating an effluent gas stream.

41. The apparatus of claim 31 and including means for discharging waste gas released during the later portion of the countercurrent depressurization step and the lower desorption pressure in said pressure swing adsorption system, said means for recycling waste gas being adapted for the recycle of only the gas richest in hydrogen released during the initial, higher pressure portion of the countercurrent depressurization step in said pressure swing adsorption system.

42. The apparatus of claim 41 and including means for recycling the gas released during the last part of a purge step carried out in said pressure swing adsorption system.

* * * * *